(12) United States Patent
Yamanaka et al.

(10) Patent No.: US 7,420,776 B2
(45) Date of Patent: Sep. 2, 2008

(54) THIN-FILM MAGNETIC HEAD, HEAD GIMBAL ASSEMBLY, AND HARD DISK DRIVE

(75) Inventors: Noboru Yamanaka, Chuo-ku (JP); Norikazu Ota, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/645,505

(22) Filed: Dec. 27, 2006

(65) Prior Publication Data
US 2007/0103814 A1 May 10, 2007

Related U.S. Application Data

(62) Division of application No. 10/778,228, filed on Feb. 17, 2004, now Pat. No. 7,187,521.

(30) Foreign Application Priority Data
Feb. 20, 2003 (JP) .............................. 2003-049879

(51) Int. Cl.
*G11B 21/02* (2006.01)
(52) U.S. Cl. ..................................... 360/128
(58) Field of Classification Search .................. 360/128
See application file for complete search history.

(56) References Cited

U.S. PATENT DOCUMENTS

| 5,991,113 | A | * | 11/1999 | Meyer et al. | .................. 360/75 |
| 6,920,020 | B2 | * | 7/2005 | Yamanaka et al. | .......... 360/317 |
| 6,950,280 | B2 | * | 9/2005 | Rea et al. | ..................... 360/126 |
| 2002/0191326 | A1 | * | 12/2002 | Xu et al. | ........................ 360/75 |
| 2004/0027719 | A1 | * | 2/2004 | Gider et al. | .................. 360/128 |

FOREIGN PATENT DOCUMENTS

| JP | A-05-020635 | 1/1993 |
| JP | A-05-026467 | 2/1993 |

\* cited by examiner

*Primary Examiner*—William Korzuch
*Assistant Examiner*—Mark Blouin
(74) *Attorney, Agent, or Firm*—Oliff & Berridge, PLC (57) ABSTRACT

A thin-film magnetic head comprises at least one of a magnetoresistive device for reading and an electromagnetic transducer device for writing, and a heating element provided in the head body part. The heating element has an up portion meandering between an origin and a halfway point and a down portion meandering along the up portion from the halfway point to an end positioned in the vicinity of the origin, and adapted to generate heat when energized.

9 Claims, 11 Drawing Sheets

THIN-FILM MAGNETIC HEAD, HEAD GIMBAL ASSEMBLY, AND HARD DISK DRIVE

This is a Divisional of U.S. patent application Ser. No. 10/778,228 filed on Feb. 17, 2004, now U.S. Pat. No. 7,187,521, which is hereby incorporated by reference in its entirety. This application claims priority to Japanese Patent Application No. 2003-049879 filed Feb. 26, 2003, which is hereby incorporated by reference in its entirety.

BACKGROUND OF THE INVENTION

1. Field of the Invention

The present invention relates to a thin-film magnetic head having a magnetoresistive device and/or an electromagnetic transducer device, a head gimbal assembly, and a hard disk drive.

2. Related Background Art

A thin-film magnetic head with a writing electromagnetic transducer device and/or a reading magnetoresistive device is configured to float or fly over a hard disk as a recording medium during recording into or reading from a hard disk drive. Specifically, the thin-film magnetic head is mounted on a gimbal, and the gimbal is attached to a distal end of a flexible suspension arm, thereby constructing a head gimbal assembly (HGA). Then an airflow made with rotation of the hard disk flows under the thin-film magnetic head to bend the suspension arm, whereupon the head flies (Japanese Patent Application Laid-Open No. 5-20635).

With increase in density of the hard disk, the air gap or head fly height between the thin-film magnetic head and the hard disk has been decreasing as 20 nm, 15 nm, and 10 nm to the limit.

SUMMARY OF THE INVENTION

For achieving higher density, it is necessary to further decrease the distance between the hard disk and, the electromagnetic transducer device and/or the magnetoresistive device of the thin-film magnetic head from those having been achieved heretofore.

The present invention has been accomplished in order to solve the above problem and an object thereof is to provide a thin-film magnetic head, a head gimbal assembly, and a hard disk drive capable of achieving a smaller spacing between the recording medium and, the electromagnetic transducer device and/or the magnetoresistive device of the thin-film magnetic head.

A thin-film magnetic head according to the present invention is a thin-film magnetic head comprising at least one of a magnetoresistive device for reading and an electromagnetic transducer device for writing; and a heating element provided in the head body part, having an up portion meandering between an origin and a halfway point and a down portion meandering along the up portion from the halfway point to an end positioned in the vicinity of the origin, and adapted to generate heat when energized.

In the thin-film magnetic head according to the present invention, the heating element is energized to generate heat to thermally expand the thin-film magnetic head, whereby the magnetoresistive device and/or the electromagnetic transducer device can be projected toward the recording medium. By controlling the level of energization of the heating element, it is feasible to control the distance between the recording medium and, the magnetoresistive device and/or the electromagnetic transducer device. Furthermore, since the heating element has the up portion meandering from the origin to the halfway point and the lower portion meandering along the up portion from the halfway point to the vicinity of the origin, magnetic fields generated through the energization by the up portion and by the down portion almost cancel each other. For this reason, the magnetic fields from the heating element cause little effect on the magnetoresistive device, the electromagnetic transducer device, and so on. These enable achievement of higher density of the hard disk drive.

In thin-film magnetic head as described above, preferably, in the heating element a spacing between the up portion and the down portion is narrower than a spacing between a first part of the up portion and a second part of the up portion adjacent to the first part of the up portion and than a spacing between a first part of the down portion and a second part of the down portion adjacent to the first part of the down portion.

In this configuration, a pair of the parts of up portion and down portion proximate to each other become less affected by the magnetic fields from another pair of the parts of the up portion and down portion distant from the pair of the parts of the up portion and down portion in question, whereby the magnetic fields generated through the energization by each pair of the parts of the up portion and down portion proximate to each other are canceled out more suitably.

Another thin-film magnetic head according to the present invention is a thin-film magnetic head comprising at least one of a magnetoresistive device for reading and an electromagnetic transducer device for writing; and a heating element comprising a plurality of unit portions, each unit portion having an up portion extending from a first point to a second point, a down portion extending along the up portion from a third point near the second point to a fourth point near the first point, and a turn portion connecting the second point and the third point, said plurality of unit portions being juxtaposed in a direction crossing an extending direction of the up portion, and connecting portions, each connecting portion connecting the first point and the fourth point adjacent to each other between the unit portions, the heating element being adapted to generate heat when energized; wherein in the heating element a distance between the unit portions is longer than a distance between the up portion and the down portion in each unit portion.

In the other thin-film magnetic head according to the present invention, the heating element is energized to generate heat to thermally expand the thin-film magnetic head, whereby the magnetoresistive device and/or the electromagnetic transducer device can be projected toward the recording medium. By controlling the level of energization of the heating element, it is feasible to control the distance between the recording medium and, the magnetoresistive device and/or the electromagnetic transducer device. Furthermore, since in each unit portion of the heating element the up portion and down portion are provided next to each other and the spacing between unit portions is wider than the spacing between the up portion and down portion in each unit portion, the magnetic fields generated through the energization by the up portion and down portion in each unit portion almost cancel each other in each unit portion. For this reason, the magnetic fields from the heating layer cause little effect on the magnetoresistive device, the electromagnetic transducer device, and so on. These enable achievement of higher density of the hard disk.

Preferably, the heating element further comprises a first auxiliary portion provided along the connecting portions.

In this configuration, magnetic fields generated by the respective connecting portions are almost canceled by a magnetic field generated by the first auxiliary portion.

Preferably, the heating element further comprises a second auxiliary portion provided along the turn portions.

In this configuration, magnetic fields generated by the respective turn portions are almost canceled by a magnetic field generated by the second auxiliary portion.

Any one of the above-stated thin-film magnetic heads may comprise a plurality of such heating elements. In this case, the degree of freedom increases for placement of the heating elements.

Any one of the above-stated thin-film magnetic heads can comprise both the aforementioned magnetoresistive device for reading and the aforementioned electromagnetic transducer device for writing. In this configuration, the thin-film magnetic head with the magnetoresistive device and the electromagnetic transducer device demonstrates the aforementioned functional effects.

A potential configuration for the thin-film magnetic heads as described above is such that the thin-film magnetic head is formed on a base, the magnetoresistive device is located between the electromagnetic transducer device and the base, an overcoat layer is provided on the opposite side of the electromagnetic transducer device to the magnetoresistive device, and the heating element is provided in the overcoat layer.

Since in this case the heating element is provided in the overcoat layer distant from the magnetoresistive device, the generated heat becomes unlikely to be transferred to the magnetoresistive device, whereby it becomes feasible to curb occurrence of trouble due to a rise of temperature of the magnetoresistive device. Since the heating element is provided in the layer different from those of the magnetoresistive device and the electromagnetic transducer device, fabrication is easy.

Another potential configuration for the thin-film magnetic heads as described above is such that the thin-film magnetic head is formed on a base, the magnetoresistive device is located between the electromagnetic transducer device and the base, an undercoat layer is provided between the magnetoresistive device and the base, and the heating element is provided in the undercoat layer.

In this case, the magnetoresistive device nearer to the heating element than the recording head part can be more projected toward the recording medium.

Another potential configuration for the thin-film magnetic heads as described above is such that the thin-film magnetic head is formed on a base, the magnetoresistive device is located between the electromagnetic transducer device and the base, and the heating element is provided on the opposite side of the magnetoresistive device and the electromagnetic transducer device to an opposed surface of a recording medium.

In this case, since the heating element can be set apart from each of the electromagnetic transducer device and the magnetoresistive device, it is feasible to prevent the electromagnetic transducer device and the magnetoresistive device from being adversely affected by the generated heat.

A head gimbal assembly according to the present invention is a head gimbal assembly comprising a base, a thin-film magnetic head formed on the base, and a gimbal adapted to fix the base, wherein the thin-film magnetic head comprises: at least one of a magnetoresistive device for reading and an electromagnetic transducer device for writing; and a heating element having an up portion meandering between an origin and a halfway point and a down portion meandering along the up portion from the halfway point to an end positioned in the vicinity of the origin, and adapted to generate heat when energized.

Another head gimbal assembly according to the present invention is a head gimbal assembly comprising a base, a thin-film magnetic head formed on the base, and a gimbal adapted to fix the base, wherein the thin-film magnetic head comprises: at least one of a magnetoresistive device for reading and an electromagnetic transducer device for writing; and a heating element comprising a plurality of unit portions, each unit portion having an up portion extending from a first point to a second point, a down portion extending along the up portion from a third point near the second point to a fourth point near the first point, and a turn portion connecting the second point and the third point, said plurality of unit portions being juxtaposed in a direction crossing an extending direction of the up portion, and connecting portions, each connecting portion connecting the first point and the fourth point adjacent to each other between the unit portions, the heating element being adapted to generate heat when energized; wherein in the heating element a distance between the unit portions is longer than a distance between the up portion and the down portion in each unit portion.

A hard disk drive according to the present invention is a hard disk drive comprising a base, a thin-film magnetic head formed on the base, and a recording medium opposed to the thin-film magnetic head, wherein the thin-film magnetic head comprises: at least one of a magnetoresistive device for reading and an electromagnetic transducer device for writing; and a heating element having an up portion meandering between an origin and a halfway point and a down portion meandering along the up portion from the halfway point to an end positioned in the vicinity of the origin, and adapted to generate heat when energized.

Another hard disk drive according to the present invention is a hard disk drive comprising a base, a thin-film magnetic head formed on the base, and a recording medium opposed to the thin-film magnetic head, wherein the thin-film magnetic head comprises: at least one of a magnetoresistive device for reading and an electromagnetic transducer device for writing; and a heating element comprising a plurality of unit portions, each unit portion having an up portion extending from a first point to a second point, a down portion extending along the up portion from a third point near the second point to a fourth point near the first point, and a turn portion connecting the second point and the third point, said plurality of unit portions being juxtaposed in a direction crossing an extending direction of the up portion, and connecting portions, each connecting portion connecting the first point and the fourth point adjacent to each other between the unit portions, the heating element being adapted to generate heat when energized; wherein in the heating element a distance between the unit portions is longer than a distance between the up portion and the down portion in each unit portion.

The head gimbal assemblies and hard disk drive of the present invention can achieve functional effects similar to those as described above because of the provision of the aforementioned thin-film magnetic head.

DESCRIPTION OF THE PREFERRED EMBODIMENTS

Preferred embodiments of the thin-film magnetic head, the head gimbal assembly, and the hard disk drive according to the present invention will be described below in detail with reference to the accompanying drawings. It is noted that the same elements will be denoted by the same reference symbols, without redundant description.

First Embodiment

Figure 1:
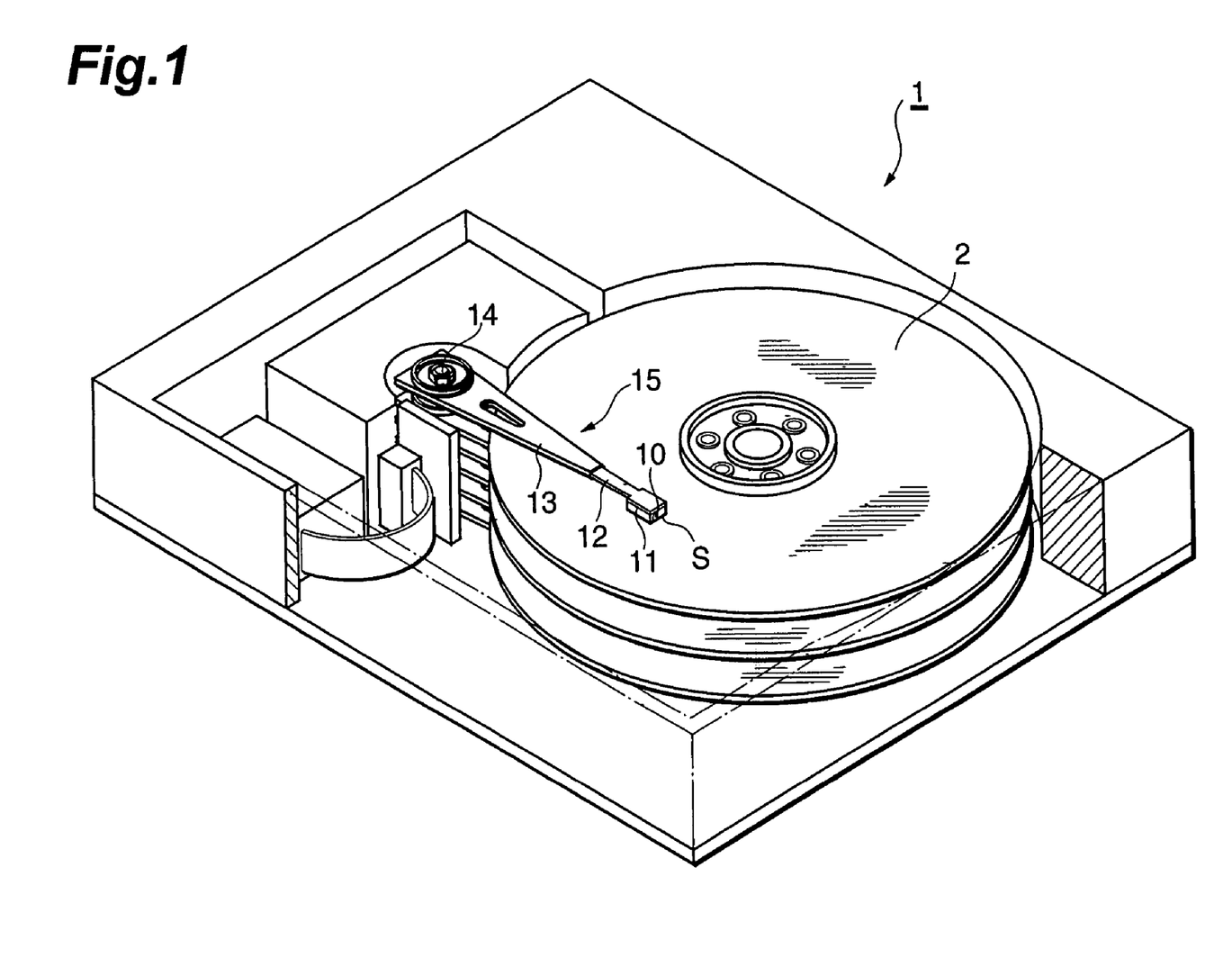
FIG. 1 is a perspective view showing an embodiment of the hard disk drive according to the present invention.

FIG. 1 is an illustration showing a hard disk drive provided with the thin-film magnetic head of the present embodiment. The hard disk drive 1 is an apparatus configured to actuate a head gimbal assembly (HGA: Head Gimbal Assembly) 15 to make the thin-film magnetic head 10 record and read magnetic information into and from a recording surface of a hard disk (recording medium) 2 rotating at high speed (the upper surface in FIG. 1). The head gimbal assembly 15 is provided with a gimbal 12 on which a head slider 11 with the thin-film magnetic head 10 formed thereon is mounted, and a suspension arm 13 connected to the gimbal 12, and is arranged rotatable about a spindle 14, for example, by a voice coil motor. With rotation of the head gimbal assembly 15, the head slider 11 moves in the radial direction of hard disk 2, i.e., in the direction crossing the track lines.

Figure 2:
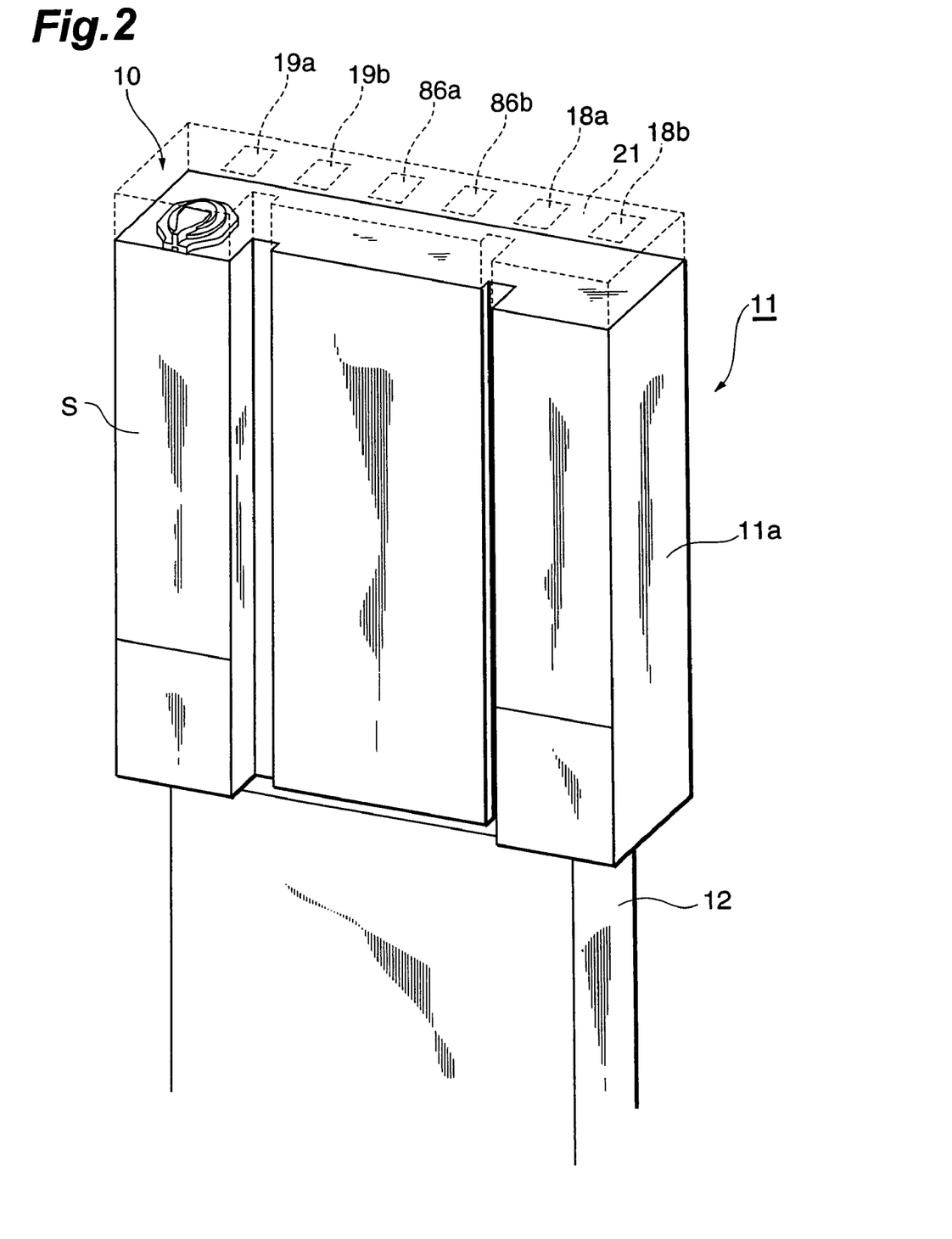
FIG. 2 is a perspective view showing a head slider.

FIG. 2 is an enlarged perspective view of the head slider 11. The head slider 11 is of almost rectangular parallelepiped shape and the thin-film magnetic head 10 is formed on a base 11a mainly made of AlTiC (Al$_2$O$_3$.TiC). This side in the same figure is a recording-medium-opposed surface opposed to the recording surface of hard disk 2, and is called an air bearing surface (ABS: Air Bearing Surface) S. During rotation of the hard disk 2, the head slider 11 flies because of an airflow made by the rotation, so that the air bearing surface S becomes spaced from the recording surface of hard disk 2. The thin-film magnetic head 10 is provided with an overcoat layer 21 (detailed later) indicated by dashed lines in the figure, for protecting the thin-film magnetic head 10. Pads for recording 18a, 18b, pads for reading 19a, 19b, and pads for later-described heater 86a, 86b are attached onto the overcoat layer 21, and wires for input/output of electric signals (not shown), which are connected to the respective pads, are attached to the suspension arm 13 shown in FIG. 1. The air bearing surface S may be coated with DLC (Diamond-Like Carbon) or the like. In FIG. 2, the pads described above are arranged in the order of the reading pads 19a, 19b, heater pads 86a, 86b, and recording pads 18a, 18b as named, but the order of arrangement is optional.

Figure 3:
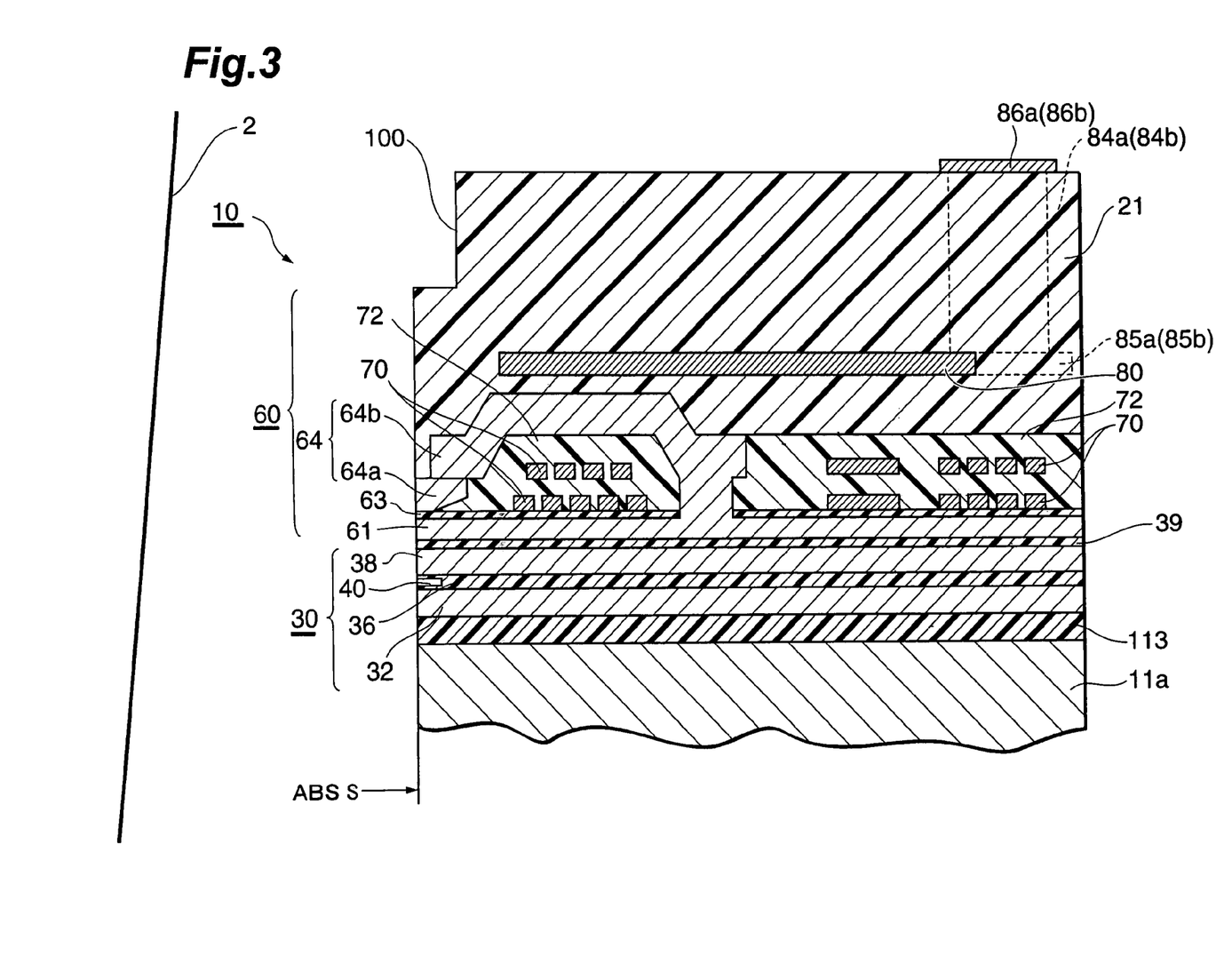
FIG. 3 is a sectional view showing an example of the thin-film magnetic head according to the first embodiment.

FIG. 3 is a sectional view of the thin-film magnetic head 10 along the direction normal to the air bearing surface S. The thin-film magnetic head 10 is a complex thin-film magnetic head formed on the base 11a and mainly having a reading head part 30 incorporating a GMR (Giant Magneto Resistive) device 40 as a magnetoresistive device, a recording head part 60 as an electromagnetic transducer device of an induction type, and an overcoat layer 21 provided on the recording head part 60, in the order named from the base 11a side.

The base 11a is a wafer-like substrate made of AlTiC (Al$_2$O$_3$.TiC) or the like, and an undercoat layer 113 of an insulating material such as alumina is formed in the thickness of about 1 µm to about 10 µm on the base 11a.

The reading head part 30 is laid on the undercoat layer 113, and is constructed of a stack of a lower shield layer 32, an insulating layer 36 including the GMR device 40 and sandwiching this GMR device 40 up and down, and an upper shield layer 38 in the order named from the undercoat layer 113 side. The GMR device 40 is one making use of the giant magnetoresistance effect with large magnetoresistance variation, is of multilayer structure (not shown), and is exposed on the ABS side. The lower shield layer 32 and upper shield layer 38 have a function of preventing the GMR device 40 from sensing an unwanted external magnetic field and contain a magnetic material. The thickness of the lower shield layer 32 is in the range of approximately 1 µm to approximately 3 µm, and the thickness of the upper shield layer 38 in the range of approximately 1 µm to approximately 4 µm. The thickness of the insulating layer 36 is in the range of 0.05 µm to 1.0 µm. The present specification sometimes uses the terms "upper" and "lower" like the shield layers, and these terms are defined so that the term "lower" means "close to the base 11a" and the term "upper" means "distant from the base 11a."

The recording head part 60 is formed through an insulating layer 39 on the reading head part 30 and is an inductive electromagnetic transducer device of the longitudinal recording system. The insulating layer 39 can be made of alumina or the like in the thickness of approximately 0.1 µm to approximately 2.0 µm, but it is not always essential. The recording head part 60 has a lower magnetic pole 61 made of a soft magnetic material and a gap layer 63 made of a nonmagnetic insulating material, in the order named from the insulating layer 39 side. On the gap layer 63 a magnetic pole part layer 64a is stacked on the ABS side, and an insulating layer 72 including two stages of upper and lower thin-film coils 70 on the side apart from the ABS. Furthermore, on the magnetic pole part layer 64a and on the insulating layer 72, there is provided a yoke part layer 64b sandwiching part of the thin-film coils 70 between the yoke part layer 64b and the lower magnetic pole 61, and magnetically connecting to the lower magnetic pole 61 on the side apart from the air bearing surface S. The lower magnetic pole 61, gap layer 63, thin-film coils 70, insulating layer 72, and upper magnetic pole 64 constitute the recording head part 60.

The lower magnetic pole 61 is a magnetic material such as permalloy (NiFe) or the like and is formed, for example, in the thickness of approximately 1 µm to approximately 3 µm.

The gap layer 63 is a nonmagnetic insulator, such as alumina (Al$_2$O$_3$), a resist, or the like, or a combination of a nonmagnetic conductor with a nonmagnetic insulator and is formed, for example, in the thickness of approximately 0.05 µm to approximately 0.5 µm.

The magnetic pole part layer 64a, together with the yoke part layer 64b, constitutes the upper magnetic pole 64, and can be made, for example, of permalloy (NiFe), or a material selected from (1) materials containing iron and nitrogen atoms, (2) materials containing iron, zirconia, and oxygen atoms, (3) materials containing iron and nickel elements, and so on. The thickness of the magnetic pole part layer 64a is, for example, in the range of about 0.5 μm to about 3.5 μm and preferably in the range of 1.0 μm to 2.0 μm.

The yoke part layer 64b is made of a material similar to that of the magnetic pole part layer 64a and has, for example, the thickness of about 1 μm to about 5 μm.

The thin-film coils 70 are conductors of Cu or the like and each coil has the thickness of about 1 μm to about 3 μm, for example.

The insulating layer 72 is an insulator such as alumina or the like and has the thickness of about 0.1 μm to about 3.0 μm, for example.

When a recording current is allowed to flow through the thin-film coils 70, magnetic flux is generated between the magnetic pole part layer 64a and the lower magnetic pole 61, so as to enable recording of information into the recording medium such as the hard disk 2 or the like.

The overcoat layer 21 is a layer made of an insulating material such as alumina or the like in the thickness of about 5 μm to about 30 μm for protecting the recording head part 60 of the thin-film magnetic head 10, and is provided on the recording head part 60. In the overcoat layer 21, a cut portion 100 is formed in the ridge region formed by the ABS S and the top surface farthest from the base 11a.

A heating layer (heating element) 80 made of Cu, NiFe, Ta, Ti, a CoNiFe alloy, an FeAlSi alloy, or the like is provided in the overcoat layer 21. This heating layer 80 is formed so as to be spaced by a predetermined distance from the ABS S and parallel to the upper shield layer 38 and others in the overcoat layer 21.

Conductive portions 84a, 84b made of a conducting material such as Cu or the like and extending upward in the figure are electrically connected to the heating layer 80, and the heater pads 86a, 86b are attached to the upper ends of the respective conducting portions 84a, 84b. In similar fashion, the recording head part 60 is connected to the recording pads 18a, 18b (cf. FIG. 2) and the magnetoresistive device 40 of the reading head part 30 to the reading pads 19a, 19b, though their illustration is omitted for simplicity in FIG. 3.

Figure 4:
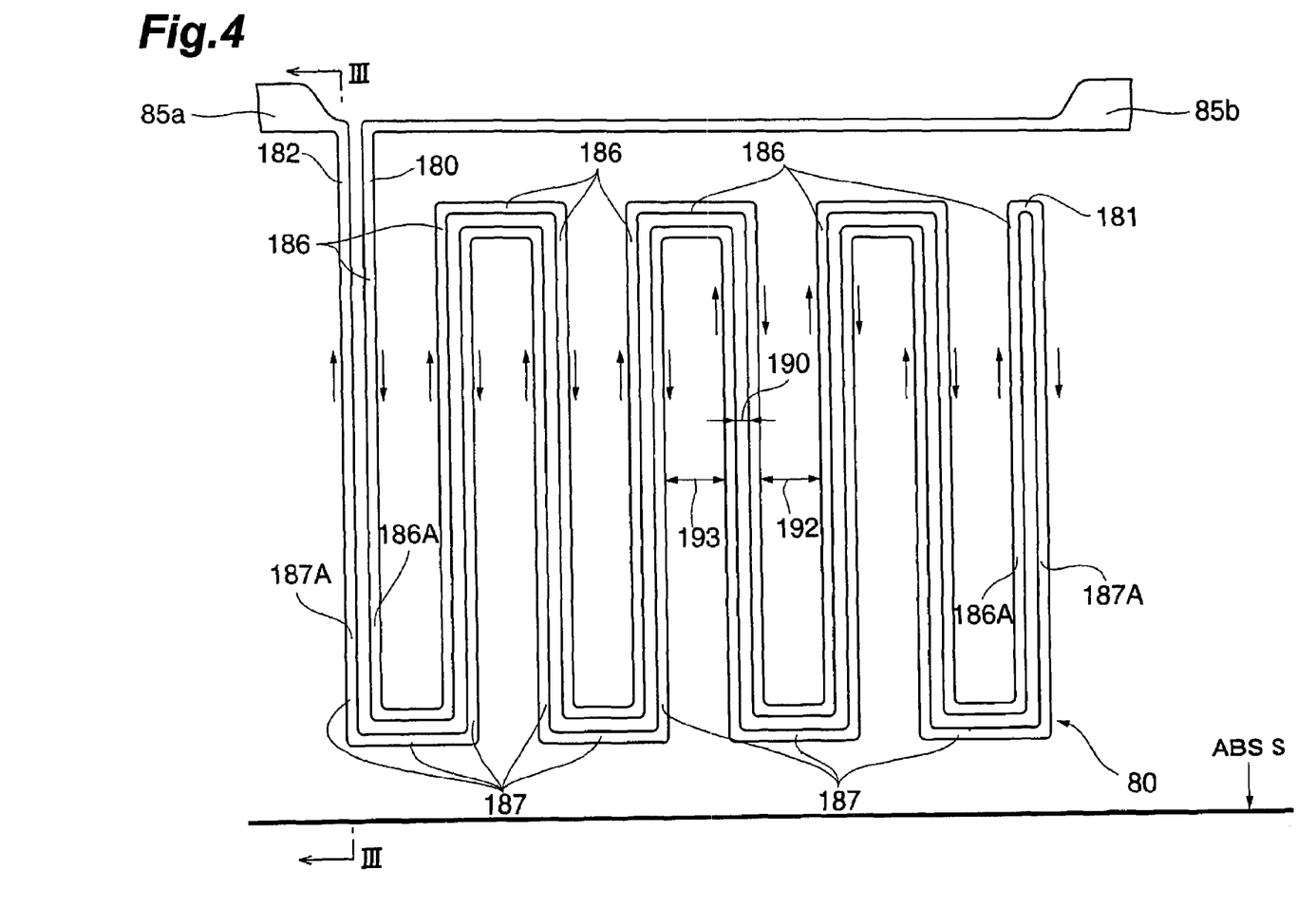
FIG. 4 is a plan view showing the heating layer of the thin-film magnetic head according to the first embodiment.

FIG. 4 is a plan view showing an example of the heating layer 80. A cross section along III-III of the heating layer 80 in FIG. 4 corresponds to the cross section of the heating layer in FIG. 3. The air bearing surface (ABS) S extends in the horizontal direction in FIG. 4 and in the direction normal to the plane of FIG. 4 and is located below the heating layer 80 in FIG. 4. In this manner, the heating layer 80 is constructed in structure in which a line meanders in the layer, and has extraction electrodes 85a, 85b at the both ends of the line. The extraction electrodes 85a, 85b are connected to the conducting portions 84a, 84b, respectively, shown in FIG. 3.

More specifically, the heating layer has an up portion 186 formed so as to meander in the rectangular wave shape from a predetermined origin 180 to a halfway point 181, and a down portion 187 formed so as to meander back along the up portion 186 from the halfway point 181 to an end 182 positioned in the vicinity of the origin 180. A spacing 190 between parts of the up portion 186 and the down portion 187 formed next to each other is narrower than a spacing 192 between parts of the up portion 186 facing each other and narrower than a spacing 193 between parts of the down portion 187 facing each other.

Specifically, the dimensions of the heating layer 80 are, for example, such that the spacing 190 is 2 μm, the spacings 192, 193 are 6 μm, and the line width of the up portion 186 and the down portion 187 is 2 μm, but they do not have to be limited to this example.

In the heating layer 80, the sum of lengths of the portions extending in the direction nearly perpendicular to the ABS S is greater than the sum of lengths of the portions extending in the direction nearly parallel to the ABS S.

Figure 5:
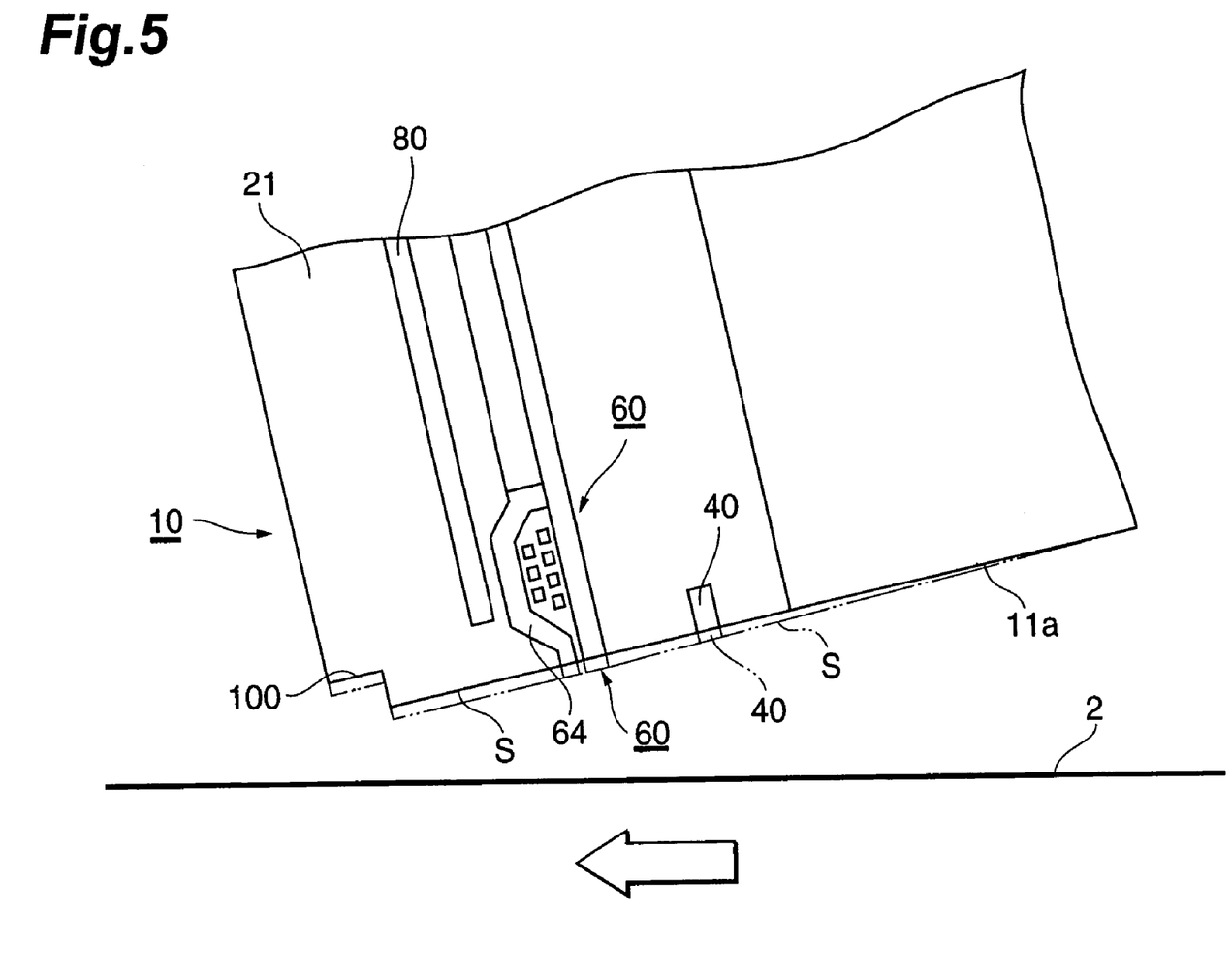
FIG. 5 is a schematic view showing a state in which the head body part of the thin-film magnetic head according to the first embodiment is thermally expanded.

Now, the operations of the thin-film magnetic head 10, head gimbal assembly 15, and hard disk drive 1 constructed as described above will be described. As shown in FIG. 5, as the hard disk 2 rotates in the direction of an arrow in the figure, the thin-film magnetic head 10 comes to fly because of the airflow and the upper magnetic pole 64 side of the recording head part 60 is held so as to lean forward toward the hard disk 2 (in a forward tilting posture). When the heating layer 80 is energized in this state, the surrounding area of the heating layer 80 in the thin-film magnetic head 10 is thermally expanded by heat generated from the heating layer 80, so that the ABS side S of the thin-film magnetic head 10 and base 11a projects toward the recording medium 2 as indicated by chain doubledashed lines. This results in decreasing the spacing between the hard disk 2 and the GMR device 40/the recording head part 60, which enables attainment of high read output and writing in higher density and the like. By controlling the level of energization of the heating layer 80, it becomes feasible to adjust the amount of projection and, in turn, control the distance between the recording medium 2 and the recording head part 60/GMR device 40.

In the heating layer 80, as shown in FIG. 4, the up portion 186 and the down portion 187 meander next to each other and, therefore, the magnetic fields generated by the up portion 186 and by the down portion 187 between the halfway point 181 and the origin 180/end 182 cancel each other, as apparent from the Ampere right-handed screw rule. This decreases the leakage of magnetic fields, so as to cause little adverse effect on the recording head part 60 and the magnetoresistive device 40. Since the spacing 190 is narrower than the spacing 193 and the spacing 192, a pair of the parts of up portion 186 and down portion 187 proximate to each other are less affected by the magnetic fields from another pair of the parts of up portion 186 and down portion 187 distant from the pair of the parts of up portion 186 and down portion 187 in question, whereby the magnetic fields generated through the energization are canceled out more suitably in each pair of parts of the up portion 186 and down portion 187 proximate to each other. For this reason, the leakage of the magnetic fields is decreased, particularly, from the outermost regions 186A, 187A of the up portion and down portion of the heating layer 80.

Since the heating layer 80 is provided in the overcoat layer 21, the spacing between the GMR device 40 and the heating layer 80 is wider than the spacing between the recording head part 60 and the heating layer 80. For this reason, the GMR device 40 relatively more susceptible to heat in particular becomes little adversely affected by high temperature, so as to enhance reliability.

In the heating layer 80, the sum of lengths of the portions extending in the direction nearly perpendicular to the ABS S is greater than the sum of lengths of the portions extending in the direction nearly parallel to the ABS S. For this reason, the expansion of the heating layer 80 itself makes the thin-film magnetic head easier to expand in the direction perpendicular to the ABS S, so that the GMR device 40 and the recording head part 60 are efficiently projected toward the recording medium 2.

Since the cut portion 100 is formed in the overcoat layer 21 of the thin-film magnetic head 10, the ABS S of the thin-film magnetic head 10 is less likely to contact the recording medium 2 even if it is projected toward the hard disk 2 because of the thermal expansion. The shape of this cut portion 100 is not limited to the single-step cut as in the present embodiment, but may be a multi-step cut, a cut with a slant face, or the like.

As described above, the present embodiment provides the thin-film magnetic head 10, head gimbal assembly 15, and hard disk drive 1 capable of decreasing the distance to the hard disk 2 and achieving higher density.

The following is an example of a method of producing the thin-film magnetic head according to the present embodiment. The description will be simplified as to well-known production steps.

Figure 6:
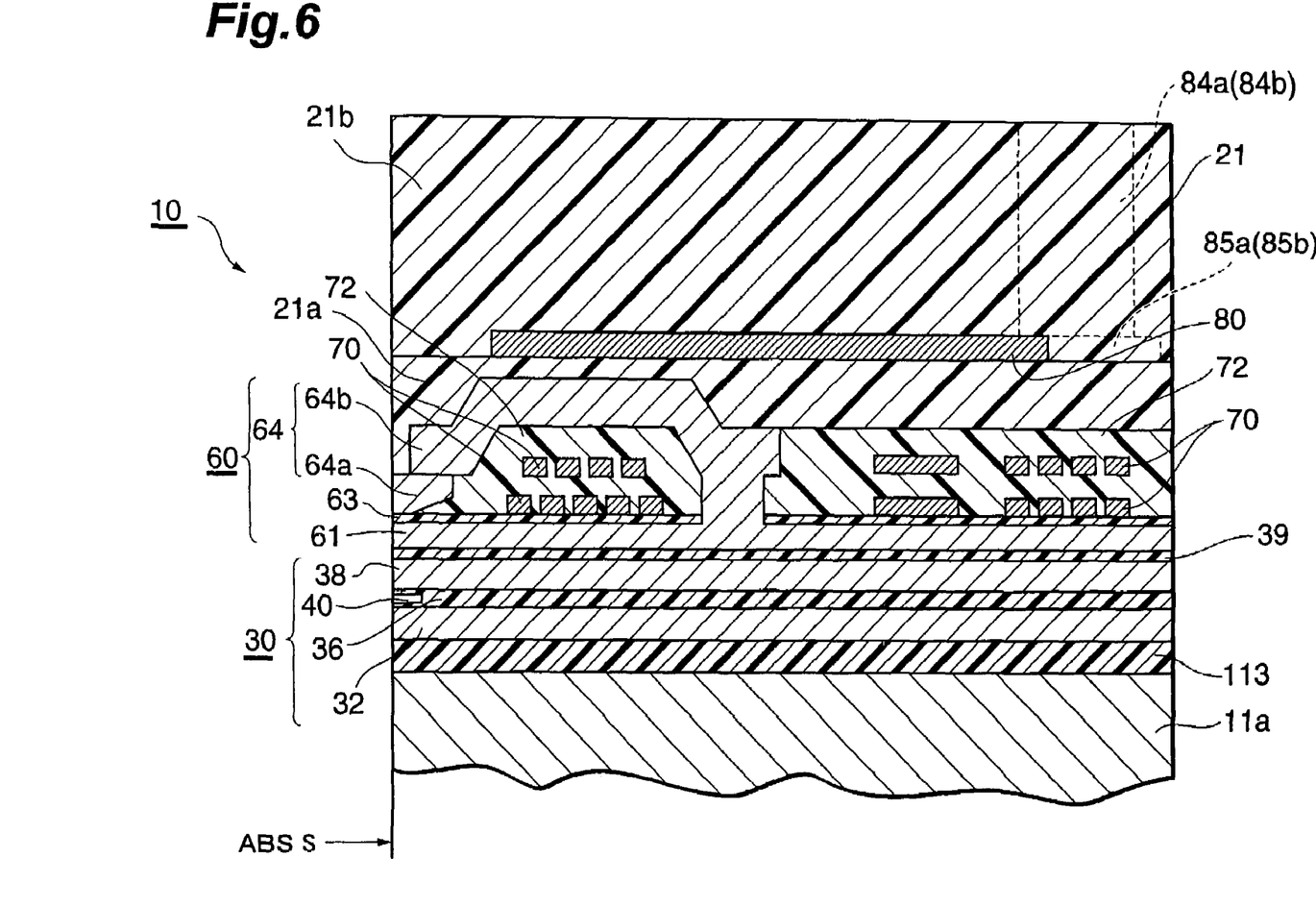
FIG. 6 is a sectional view showing a method of producing the thin-film magnetic head according to the first embodiment.

At the first step, as shown in FIG. 6, the undercoat layer 113 of an insulating material, for example, such as alumina ($Al_2O_3$) is formed by sputtering on the base 11a being a substrate of AlTiC ($Al_2O_3$.TiC) or the like.

At the next step, the lower shield layer 32 of a magnetic material such as permalloy is formed, for example, by plating on the undercoat layer 113. Furthermore, the GMR device 40, and the insulating layer 36 of $Al_2O_3$ or the like embracing it from top and bottom and from left and right are formed on the lower shield layer 32 by known techniques. The GMR device 40 is comprised of a plurality of films in fact, but it is illustrated as a single layer in the figure. This GMR device 40 is formed on the ABS side. Subsequently, the upper shield layer 38 is formed on the insulating layer 36, for example, by plating. The above yields the reading head part 30.

At the next step, the insulating layer 39 of an insulating material such as $Al_2O_3$ is formed, for example, by sputtering on the upper shield layer 38.

Subsequently, the lower magnetic pole 61 of permalloy is formed on the insulating layer 39, for example, by sputtering. Next, the gap layer 63 of a nonmagnetic material is formed on the lower magnetic pole 61, for example, by sputtering. Furthermore, the insulating layer 72 with the two-stage thin-film coils 70, the magnetic pole part layer 64a of the upper magnetic pole 64, and the yoke part layer 64b of the upper magnetic pole 64 are formed on the gap layer 63 by known methods using photolithography, dry etching, and so on. At this step, they are formed so that part of the thin-film coils 70 is interposed between the lower magnetic pole 61 and the upper magnetic pole 64. The two-step thin-film coils 70 are formed in the present embodiment; however, the number of steps is not limited to this example and helical coils or the like may be formed. This completes the recording head part 60.

At the next step, a nonmagnetic overcoat lower layer 21a is formed so as to cover the recording head part 60. Then the heating layer 80 of a conducting material is formed on the overcoat lower layer 21a by sputtering.

By forming the heating layer 80 by sputtering herein, it is feasible to decrease the variation of thickness of the heating layer 80 and the variation of resistance of the heating layer 80 among thin-film magnetic heads. Specifically, for example, in a case where 2447 heating layers 80 of NiFe were formed by plating, the standard deviation of resistance of the heating layers was 11.6Ω; whereas, in a case where 7931 heating layers 80 of NiFe were formed by sputtering, the standard deviation of resistance of the heating layers was 4.66Ω. The heating layer 80 can also be fabricated by plating.

Then the conducting portions 84a, 84b are formed on the extraction electrodes 85a, 85b of the heating layer 80, for example, by plating and thereafter an insulating material of $Al_2O_3$ or the like is deposited as an upper layer by sputtering. This insulating material is smoothed to a desired height by polishing to obtain an overcoat upper layer 21b. Thereafter, the heater pads 86a, 86b are placed on the upper ends of the conducting portions 84a, 84b. Here the overcoat lower layer 21a and overcoat upper layer 21b correspond to the overcoat layer 21. Although omitted from the illustration, the unrepresented recording pads and reading pads are also formed at this stage. Furthermore, the ridge region of the overcoat layer 21 is cut to form the cut portion 100.

The above completes the thin-film magnetic head 10 of the present embodiment.

As described above, the thin-film magnetic head 10 according to the present embodiment can be produced at low cost, because the heating layer 80 can be formed in the relatively easy step of forming the overcoat layer 21, which is carried out after the relatively complex steps of forming the reading head part 30 and recording head part 60.

Subsequently, a slider rail is formed in the base 11a by ion milling or the like, to obtain the head slider 11 shown in FIG. 2, and this head slider 11 is mounted on the gimbal 12. Thereafter, the gimbal 12 is connected to the suspension arm 13, thereby completing the head gimbal assembly 15 shown in FIG. 1. After the fabrication of head gimbal assembly 15, the components are assembled so that the head slider 11 is movable above the hard disk 2 and capable of recording and reading magnetic signals, thereby completing the hard disk drive 1 shown in FIG. 1.

Figure 7:
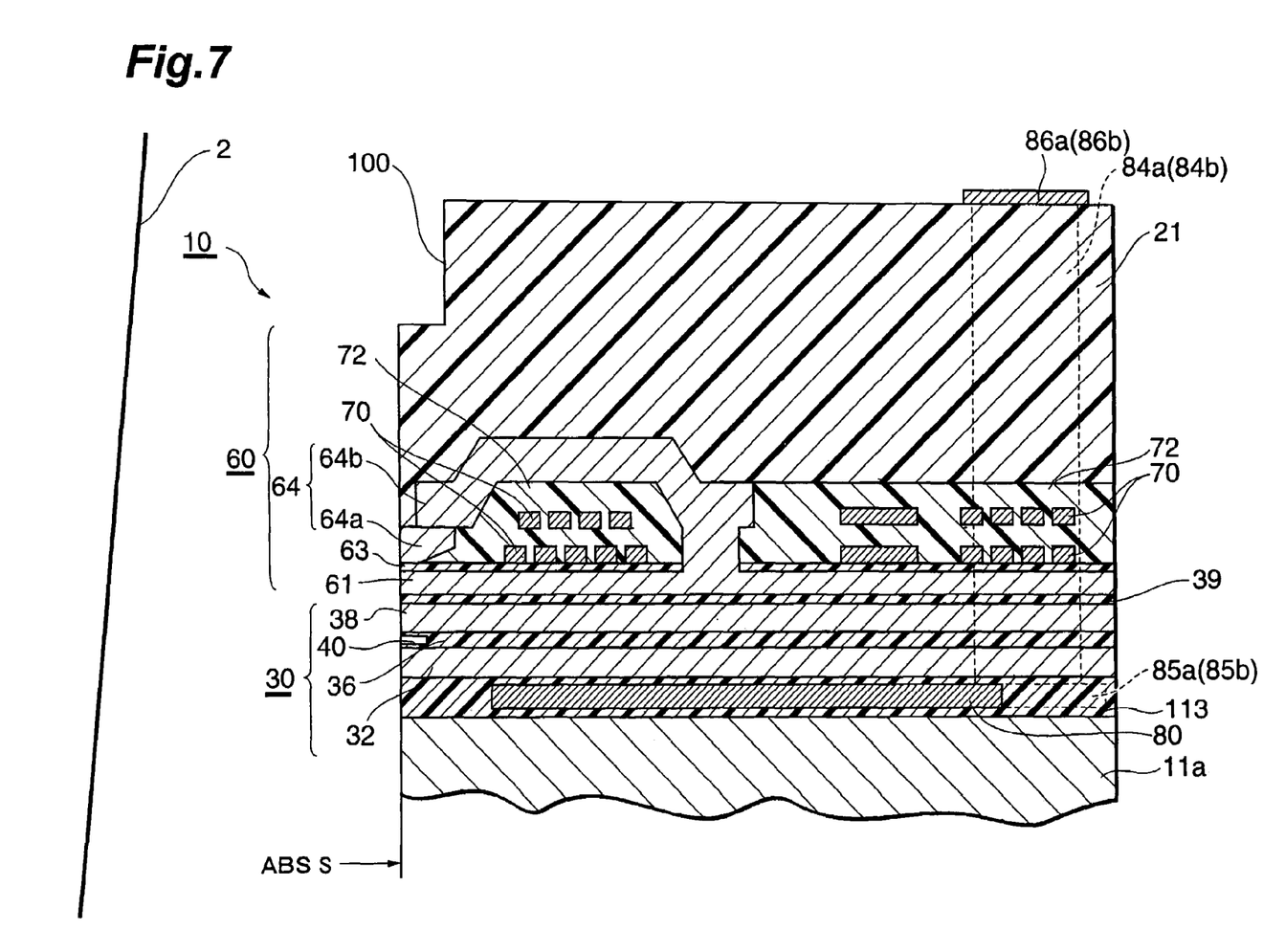
FIG. 7 is a sectional view showing a modification example of the thin-film magnetic head according to the first embodiment.

Described next is a configuration of a modification example of the present embodiment. In the present embodiment the location of the heating layer 80 is not limited to the interior of the overcoat layer 21. For example, as shown in FIG. 7, the heating layer 80 may be provided in the undercoat layer 113. In this configuration, particularly, the GMR device 40 closer to the heating layer 80 than the recording head part 60 can be projected more toward the recording medium 2.

Figure 8:
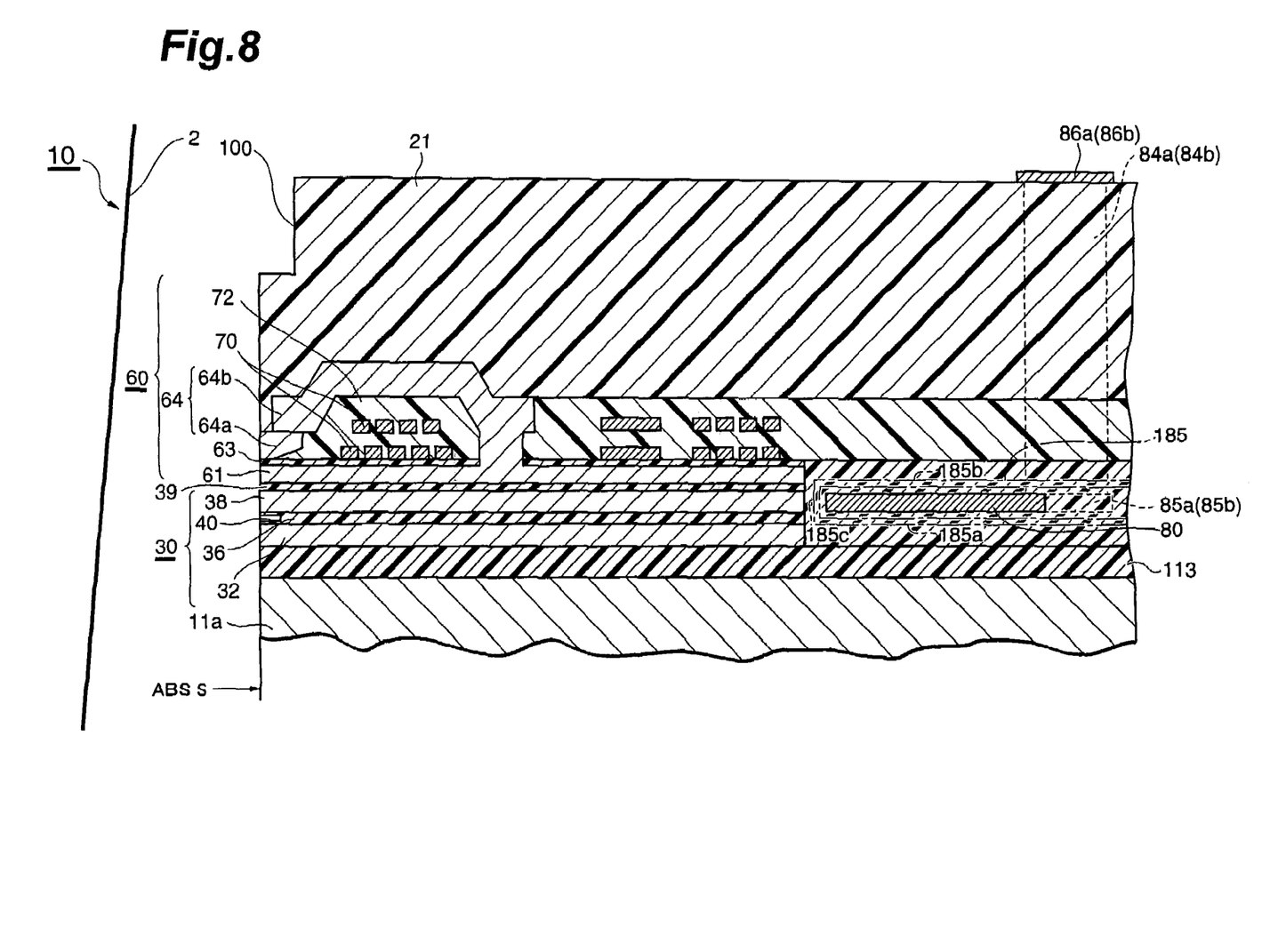
FIG. 8 is a sectional view showing another modification example of the thin-film magnetic head according to the first embodiment.

In another configuration, as shown in FIG. 8, the heating layer 80 is provided on the opposite side of the recording head part 60 and GMR device 40 to the ABS side. In this configuration, since the heating layer 80 is apart from the recording head part 60 and the GMR device 40, the recording head part 60 and the GMR device 40 become less likely to be adversely affected by the generated heat in particular.

Figure 9:
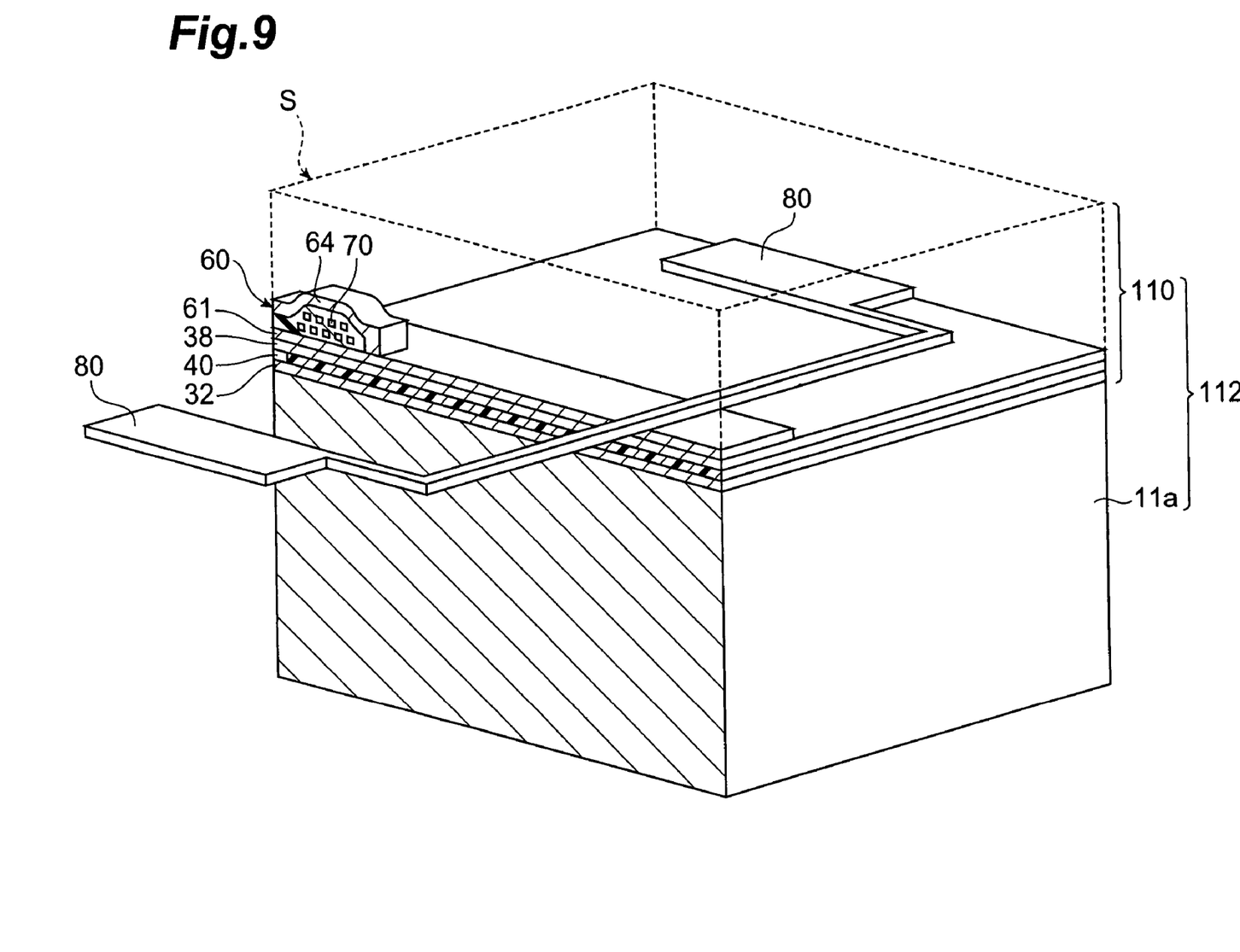
FIG. 9 is a perspective view broken normally to the air bearing surface, to show still another modification example of the thin-film magnetic head according to the first embodiment.

In a further modification example, for example, two heating layers 80, 80 may be provided as shown in FIG. 9. In this modification example, the heating layers 80, 80 are spaced from each other in the direction parallel to the surface of the base 11a and parallel to the air bearing surface S. This configuration increases the degree of freedom, particularly, for the placement of heating layers 80. In this case the height of the heating layers 80 from the base 11a may be equal to the height of the recording head part 60 or the reading head part 30, equal to the height inside the undercoat layer 113, or equal to the height inside the overcoat layer 21. There are no particular restrictions on the distance of the heating layers 80, 80 from the ABS side S side and on the distance of the spacing between the heating layers. It is also possible to provide three or more heating layers.

In the present embodiment, a shield layer 185 of a magnetic material such as NiFe, an FeAlSi alloy, or the like may be formed so as to surround the heating layer 80, for example, as indicated by chain lines in FIG. 8. In this case, even if the above-stated configurations fail to cancel out the magnetic fields upon the energization of the heating layer 80 to produce a weak magnetic field, the shield layer 185 will absorb the remaining magnetic field, so as to prevent the GMR device 40 from sensing the unwanted magnetic field during the reading operation and prevent the magnetic field from affecting the writing into the recording medium 2 by the recording head part 60.

Here the shield layer 185 is comprised, for example, of a first layer 185*a* covering at least part of the bottom surface of the heating layer 80, a second layer 185*b* covering at least part of the top surface, and a third layer 185*c* located on the air bearing surface S side of the heating layer 80 and connecting the first layer 185*a* and the second layer 185*b*. By this configuration wherein the third layer 185*c* covers the air bearing surface S side of the heating layer 80 and wherein the first layer 185*a* and the second layer 185*b* cover the bottom and top sides, it is feasible to effectively prevent the magnetic field from negatively affecting the GMR device 40 and others. In order to increase the shield rate of the magnetic field from the heating layer 80, the width on the view from the air bearing surface S, of the first layer 185*a*, the second layer 185*b*, and the third layer 185*c* is preferably set wider than the width of the heating layer 80. Furthermore, the first layer 185*a* and the second layer 185*b* may have such dimensions as not to cover part of the heating layer 80 but as to cover the entire surface of the heating layer 80.

Second Embodiment

The thin-film magnetic head according to the second embodiment will be described below with reference to FIG. 10. The present embodiment is different from the first embodiment only in the form of the heating layer 80, and thus only the heating layer will be described below.

This heating layer 80 has a plurality of unit portions 288 of hairpin shape and a plurality of connection portions 287 each connecting the unit portions 288 to each other, and meanders in the layer.

A unit portion 288 has an up portion 288*a* almost linearly connecting a first point 281 and a second point 282 and extending nearly perpendicularly to the air bearing surface S, a down portion 288*b* linearly extending almost along the up portion 288*a* from a third point 283 near the second point 282 to a fourth point 284 near the first point 281, and a turn portion 288*c* connecting the second point 282 and the third point 283, and is of a nearly U-shaped form.

Figure 10:
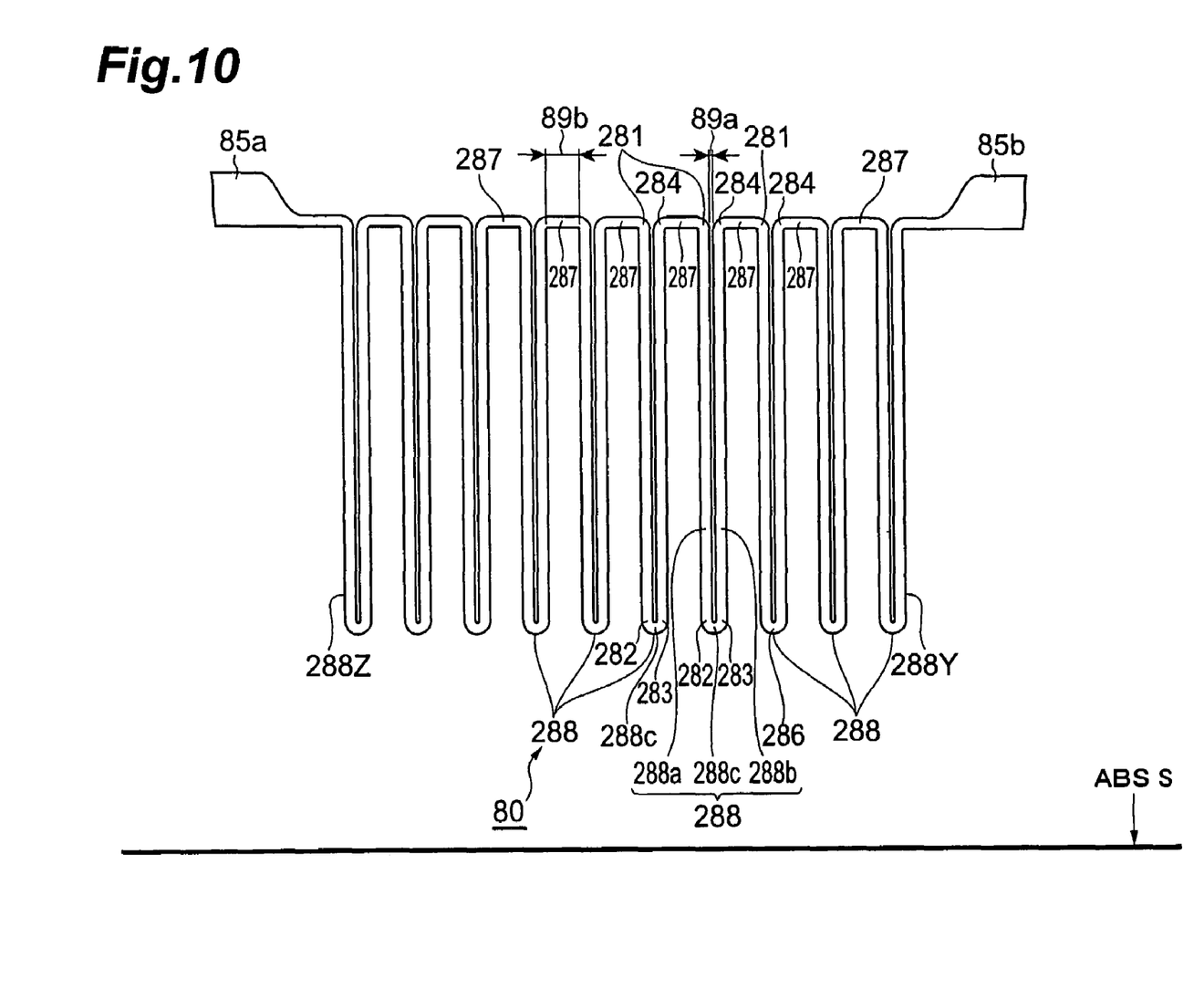
FIG. 10 is a plan view showing the heating layer of the thin-film magnetic head according to the second embodiment.

There are a plurality of such unit portions 288 provided in the transverse direction in FIG. 10, i.e., in the direction crossing the extending direction of the up portion 288*a*.

These unit portions 288 are connected in series to each other by the respective connection portions 287 to constitute a resistor as a whole. Specifically, the first point 281 and the fourth point 284 of unit portions 288 adjacent to each other are connected to each other by a connection portion 287. The ends of the outermost unit portions 288Z, 288Y are connected to the extraction electrodes 85*a*, 85*b*, respectively.

A spacing between the up portion 288*a* and the down portion 288*b* in each unit portion 288 is set smaller than a spacing 89*b* between unit portions 288.

Specifically, the dimensions of the heating layer 80 can be, for example, such that the spacing 89*a* is 2 μm, the spacing 89*b* is 6 μm, and the width of the unit portions 288 and the connection portions 287 is 2 μm, but they are not limited to this example.

In the heating layer 80, the sum of lengths of the portions (up portions 288*a* and down portions 288*b*) extending in the direction nearly perpendicular to the ABS S is greater than the sum of lengths of the portions (connection portions 287 and turn portions 288*c*) extending in the direction nearly parallel to the ABS S.

Then a voltage is placed between the heater pads 86*a*, 86*b* to energize the heating layer 80 (e.g., an electric current of about 20 mA is allowed to flow), whereby the heating layer 80 generates heat. This heating layer 80 may be placed at any place, as described in the first embodiment.

In the present embodiment, just as in the first embodiment, the thin-film magnetic head 10 is thermally expanded by heat of the heating layer 80, whereby it is feasible to decrease the spacing between the hard disk 2 and the GMR device 40/recording head part 60 and obtain high reading output and to implement writing or the like in higher density. By controlling the level of energization of the heating layer 80, it is feasible to control the distance between the recording medium 2 and, the upper magnetic pole 64 and the lower magnetic pole 61 of the recording head part 60 or the GMR device 40.

Furthermore, since in the heating layer 80, as shown in FIG. 10, the upper portion 288*a* and lower portion 288*b* in each unit portion 288 are provided so as to extend next to each other, the magnetic fields generated through the energization by the up portion 288*a* and by the lower portion 288*b* in each unit portion 288 cancel each other, as apparent from the Ampere right-handed screw rule. Since the spacing 89*b* between unit portions 288 is wider than the spacing 89*a* between the up portion 288*a* and the down portion 288*b* in each unit portion 288, each unit portion 288 becomes less likely to be affected by the magnetic fields from adjacent unit portions 288, and the magnetic fields are canceled out in each unit portion 288. For this reason, the leakage of magnetic field is decreased, particularly, from the outermost unit portions 288Z, 288Y among the juxtaposed unit portions 288.

Since in the heating layer 80 the sum of lengths of the portions extending in the direction nearly perpendicular to the ABS S is greater than the sum of lengths of the portions extending in the direction nearly parallel to the ABS S, it is easier for the heater itself to expand in the direction normal to the ABS S, so that the GMR device 40 and the recording head part 60 can be efficiently projected toward the recording medium 2.

Third Embodiment

Figure 11:
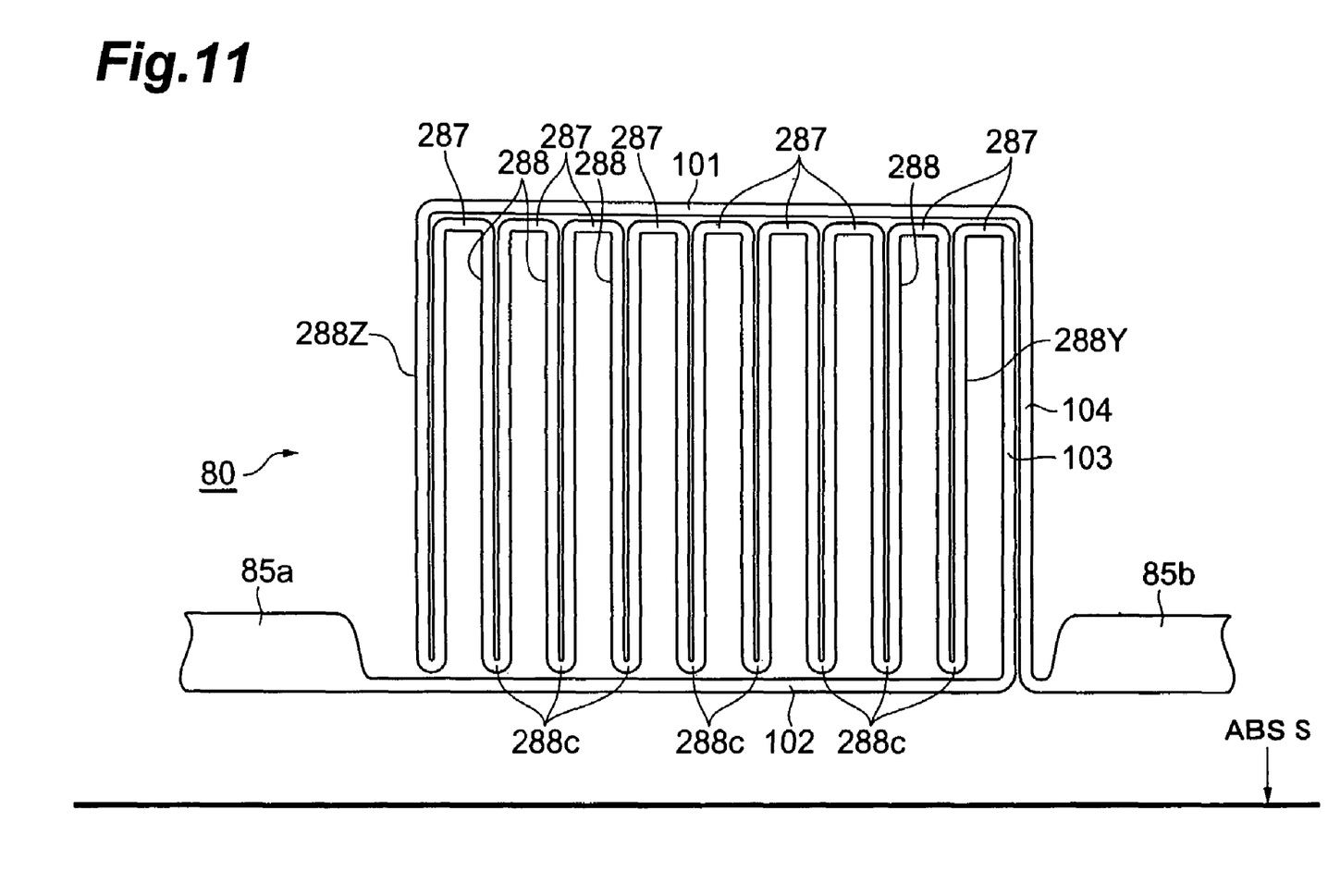
FIG. 11 is a plan view showing the heating layer of the thin-film magnetic head according to the third embodiment.

The thin-film magnetic head according to the third embodiment will be described below with reference to FIG. 11. The present embodiment is different from the second embodiment only in the form of the heating layer 80, and thus only the heating layer will be described below. The heating layer 80 of the present embodiment is different from the heating layer 80 in the second embodiment in that the heating layer 80 of the present embodiment is further provided with a first auxiliary portion 101 disposed along the connection portions 287 and a second auxiliary portion 102 disposed along the turn portions 288*c*.

An end of the second auxiliary portion 102 is connected through a second connection portion 103 parallel to the unit portion 288Y, to one end of one outermost unit portion 288Y out of the plurality of unit portions 288 juxtaposed. The distance between the second connection portion 103 and the unit portion 288Y is approximately equal to the distance between unit portions 288. Furthermore, the other end of this second auxiliary portion 102 is connected to the extraction electrode 85*a*.

One end of the first auxiliary portion 101 is connected to one end of the other outermost unit portion 288Z out of the plurality of unit portions 288 juxtaposed, and the other end of the first auxiliary portion 101 is connected through a third connection portion 104 to the extraction electrode 85*b*. Here the third connection portion 104 is provided along the second connection portion 103. The distance between the third connection portion 104 and the second connection portion 103 is approximately equal to the distance between the up portion and the down portion in each unit portion 288.

When the heating layer 80 is formed in this configuration, the following functional effects are expected, in addition to the functional effects similar to those in the second embodiment. Namely, the magnetic fields generated by the turn portions 288c in the respective unit portions 288 are reduced by the magnetic field generated by the second auxiliary portion 102 located along these turn portions 288c. The magnetic fields generated by the respective connection portions 287 are also reduced by the magnetic field generated by the first auxiliary portion 101. Furthermore, the magnetic field generated by the second connection portion 103 is canceled by the magnetic field generated by the third connection portion 104. For this reason, the leaking magnetic field can be reduced more and the effect on the GMR device 40 and on the recording head part 60 can be reduced more than by the heating layer 80 in the second embodiment.

The above described the invention accomplished by the present inventors, specifically on the basis of the embodiments thereof, but it is noted that the present invention is by no means intended to be limited to the above embodiments.

For example, the thin-film magnetic head had both the GMR device 40 and the recording head part 60 in the above embodiments, but the thin-film magnetic head may also be configured to have either one of them.

The heating layer 80 may be located anywhere in the thin-film magnetic head 10, without having to be limited to the places described in the first embodiment. It is also possible to provide two or more heating layers 80. There are no particular restrictions on the distance of the heating layer 80 from the ABS side. The above embodiments showed the heating layer 80 formed so that the sum of lengths of the portions extending in the direction nearly perpendicular to the ABS S was greater than the sum of lengths of the portions extending in the direction nearly parallel to the ABS S, but it is possible to implement the operation in a configuration not satisfying this condition, for example, in a configuration in which the ABS S extends in the vertical direction in FIG. 4 and in the direction normal to the plane of FIG. 4 so as to be located on the left in FIG. 4 to the heating layer 80. Furthermore, there are no particular restrictions on the form of the heating layer 80.

The thin-film magnetic head may be one of the perpendicular recording system, instead of the longitudinal recording system.

Furthermore, in the reading head part 30 the aforementioned GMR device 40 may be replaced by another MR device such as a CPP (Current Perpendicular to Plane)-GMR device, an AMR (Anisotropy Magneto Resistive) device making use of the anisotropic magnetoresistance effect, a TMR (Tunnel-type Magneto Resistive) device making use of the magnetoresistance effect occurring in a tunnel junction, or the like.

FIG. 2 shows the configuration wherein the thin-film magnetic head 10 incorporating the recording head part 60 and the GMR device 40 is located at one end part in the track width direction perpendicular to the track lines, in the distal end region of the slider 11, but it may be located at the other end part or in the central region in the track width direction. The point is that the thin-film magnetic head 10 is located at the position facing the ABS S on the slider 11.

As described above, the present invention provides the thin-film magnetic head, head gimbal assembly, and hard disk drive capable of decreasing the spacing between the recording medium and, the magnetoresistive device and/or the electromagnetic transducer device of the thin-film magnetic head.

The basic Japanese Application No. 2003-49879 filed on Feb. 26, 2003 is hereby incorporated by reference.

What is claimed is:

1. A thin-film magnetic head comprising:
at least one of a magnetoresistive device for reading and an electromagnetic transducer device for writing to a recording medium; and
a heating element energized to thermally expand the thin film magnetic head to control the distance from the recording medium,
wherein the heating element has a first portion starting from a first point that meanders along a path to a halfway point, and a second portion that returns along the path parallel and adjacent to the first portion to a second point, wherein a first distance between the first and second portions is narrower than a second distance between adjacent parallel parts of each portion.

2. The thin-film magnetic head according to claim 1, wherein parallel and adjacent sections of the first and second portions form a plurality of two line segments that are parallel, adjacent, and opposite each other, spaced apart a second distance that is greater than the first distance maintained between the first and second portion.

3. The thin-film magnetic head according to claim 1, comprising a plurality of said heating elements.

4. The thin-film magnetic head according to claim 1, comprising both the magnetoresistive device for reading and the electromagnetic transducer device for writing.

5. The thin-film magnetic head according to claim 4, said thin-film magnetic head being formed on a base, wherein the magnetoresistive device is located between the electromagnetic transducer device and the base, wherein an overcoat layer is provided on the opposite side of the electromagnetic transducer device to the magnetoresistive device, and wherein the heating element is provided in the overcoat layer.

6. The thin-film magnetic head according to claim 4, said thin-film magnetic head being formed on a base, wherein the magnetoresistive device is located between the electromagnetic transducer device and the base, wherein an undercoat layer is provided between the magnetoresistive device and the base, and wherein the heating element is provided in the undercoat layer.

7. The thin-film magnetic head according to claim 4, said thin-film magnetic head being formed on a base, wherein the magnetoresistive device is located between the electromagnetic transducer device and the base, and wherein the heating element is provided on the opposite side of the magnetoresistive device and the electromagnetic transducer device to an opposed surface of a recording medium.

8. A head gimbal assembly comprising a base, a thin-film magnetic head formed on the base, and a gimbal adapted to fix the base,
wherein the thin-film magnetic head comprises:
at least one of a magnetoresistive device for reading and an electromagnetic transducer device for writing to a recording medium; and
a heating element energized to thermally expand the thin film magnetic head to control the distance from the recording medium,
wherein the heating element has a first portion starting from a first point that meanders along a path to a halfway point, and a second portion that returns along the path parallel and adjacent to the first portion to a second point, wherein a first distance between the first and second portions is narrower than a second distance between adjacent parallel parts of each portion.

9. A hard disk drive comprising a base, a thin-film magnetic head formed on the base, and a recording medium opposed to the thin-film magnetic head,
   wherein the thin-film magnetic head comprises:
   at least one of a magnetoresistive device for reading and an electromagnetic transducer device for writing; and
a heating element energized to thermally expand the thin film magnetic head to control the distance from the recording medium,
wherein the heating element has a first portion starting from a first point that meanders along a path to a halfway point, and a second portion that returns along the path parallel and adjacent to the first portion to a second point, wherein a first distance between the first and second portions is narrower than a second distance between adjacent parallel parts of each portion.

* * * * *